(12) United States Patent
Reuter et al.

(10) Patent No.: US 10,840,779 B2
(45) Date of Patent: Nov. 17, 2020

(54) DRIVE DEVICE FOR A MOTOR VEHICLE

(71) Applicant: Bayerische Motoren Werke Aktiengesellschaft, Munich (DE)

(72) Inventors: Martin Reuter, Munich (DE); Alfred Grom, Glonn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/254,707

(22) Filed: Jan. 23, 2019

(65) Prior Publication Data

US 2019/0157947 A1   May 23, 2019

Related U.S. Application Data

(63) Continuation of application No. PCT/EP2017/070415, filed on Aug. 11, 2017.

(30) Foreign Application Priority Data

Sep. 6, 2016   (DE) .................. 10 2016 216 909

(51) Int. Cl.
*H02K 11/40*   (2016.01)
*H01R 39/64*   (2006.01)
(Continued)

(52) U.S. Cl.
CPC .......... *H02K 11/40* (2016.01); *H01R 39/646* (2013.01); *H02K 7/003* (2013.01); *B60K 6/26* (2013.01);
(Continued)

(58) Field of Classification Search
CPC .............. H01R 39/646; H01R 13/648; H01R 13/6485; H01R 39/30; H02K 11/40;
(Continued)

(56) References Cited

U.S. PATENT DOCUMENTS 3,404,312 A * 10/1968 Gilbert ................. H01R 39/646
361/42
3,835,436 A *  9/1974 Klaudy ................ H01R 39/646
439/5
(Continued)

FOREIGN PATENT DOCUMENTS

CN   102725546 A   10/2012
CN   103516143 A   1/2014
(Continued)

OTHER PUBLICATIONS

English machine translation, Morimoto JP 2008-45697. (Year: 2008).*

(Continued)

*Primary Examiner* — Burton S Mullins
(74) *Attorney, Agent, or Firm* — Crowell & Moring LLP

(57) ABSTRACT

A drive device for a motor vehicle includes at least one electric machine and at least one shaft, which shaft is rotatably mounted on a housing element of the drive device and can be driven by the electric machine. At least one discharge ring is provided by which the shaft is brought into electrical contact with the housing element in order to dissipate electrical charges from the shaft to the housing element via the discharge ring. The discharge ring is formed from an electrically conductive fluid.

12 Claims, 1 Drawing Sheet

(51) Int. Cl.
*B60K 6/26* (2007.10)
*B60L 50/00* (2019.01)
*H02K 7/00* (2006.01)

(52) U.S. Cl.
CPC ........... *B60L 50/00* (2019.02); *B60Y 2200/91* (2013.01); *B60Y 2200/92* (2013.01); *B60Y 2400/60* (2013.01)

(58) Field of Classification Search
CPC ........ B60L 50/00; B60L 6/26; B60Y 2200/91; B60Y 2200/92; B60Y 2400/60; B60K 6/26
USPC .................................................. 439/178–179
See application file for complete search history.

(56) References Cited

U.S. PATENT DOCUMENTS

| | | | | | |
|---|---|---|---|---|---|
| 3,916,235 | A | * | 10/1975 | Massar | H02K 31/04 310/219 |
| 4,267,461 | A | * | 5/1981 | Grassmann | H04B 15/02 307/105 |
| 4,515,417 | A | * | 5/1985 | Shiraishi | H02K 11/40 384/445 |
| 4,831,295 | A | * | 5/1989 | Posedel | H02H 7/06 310/221 |
| 5,650,679 | A | | 7/1997 | Boggs, III et al. | |
| 6,075,299 | A | * | 6/2000 | Miyazaki | H02K 11/40 310/75 R |
| 7,339,777 | B2 | * | 3/2008 | Barnard | H01R 39/64 361/212 |
| 7,528,513 | B2 | * | 5/2009 | Oh | H02K 11/40 310/88 |
| 7,608,950 | B2 | * | 10/2009 | Brauer | H02K 11/40 310/68 B |
| 8,169,766 | B2 | * | 5/2012 | Oh | H02K 11/40 361/221 |
| 8,189,317 | B2 | * | 5/2012 | Oh | H02K 11/40 361/221 |
| 8,247,117 | B2 | * | 8/2012 | Matsumoto | C07F 5/02 429/122 |
| 8,378,548 | B2 | * | 2/2013 | Oh | H02K 11/40 310/228 |
| 8,488,293 | B2 | * | 7/2013 | Baumann | F16C 19/52 361/222 |
| 8,604,653 | B2 | * | 12/2013 | Orlowski | H01R 39/10 310/68 R |
| 8,651,745 | B2 | * | 2/2014 | Mayr | F16C 41/002 384/462 |
| 8,963,398 | B2 | * | 2/2015 | Roman | H02K 11/40 310/239 |
| 9,088,197 | B2 | * | 7/2015 | Nair | H02K 11/40 |
| 9,634,547 | B1 | * | 4/2017 | Orlowski | F16J 15/4478 |
| 2002/0121821 | A1 | * | 9/2002 | Ritter | H02K 11/40 310/71 |
| 2011/0149459 | A1 | | 6/2011 | Baumann | |
| 2012/0161563 | A1 | | 6/2012 | Mayr et al. | |
| 2013/0038182 | A1 | * | 2/2013 | Obata | H02K 7/083 310/68 R |
| 2014/0369821 | A1 | * | 12/2014 | Finck | H02K 5/124 415/174.5 |
| 2015/0256054 | A1 | * | 9/2015 | Northwall | H02K 11/40 310/68 C |
| 2017/0276179 | A1 | * | 9/2017 | Hutchison | F16C 19/06 |
| 2017/0353087 | A1 | * | 12/2017 | Magno Dos Santos | H02K 5/16 |
| 2018/0123421 | A1 | * | 5/2018 | Herrmann | F16D 3/68 |

FOREIGN PATENT DOCUMENTS

| | | | |
|---|---|---|---|
| DE | 35 11 755 A1 | 10/1985 | |
| DE | 10 2004 011 867 B3 | 8/2005 | |
| DE | 10 2005 045 960 A1 | 4/2007 | |
| DE | 102005045960 * | 4/2007 | ........... H01R 39/646 |
| DE | 10 2009 036 856 A1 | 2/2011 | |
| DE | 10 2010 024 431 A1 | 8/2011 | |
| DE | 102010039065 * | 2/2012 | ............. H01R 39/00 |
| DE | 11 2010 004 938 T5 | 11/2012 | |
| DE | 10 2013 200 356 A1 | 8/2013 | |
| DE | 102012213920 * | 2/2014 | ............. H02K 11/40 |
| DE | 10 2014 203 652 A1 | 9/2014 | |
| DE | 10 2014 225 225 A1 | 6/2016 | |
| EP | 1 744 412 A2 | 1/2007 | |
| FR | 2 999 356 A1 | 6/2014 | |
| FR | 2999356 A1 * | 6/2014 | ............. H02K 11/40 |
| FR | 2933544 * | 5/2016 | ............. H02K 11/40 |
| JP | 2008-45697 A | 2/2008 | |
| WO | 2006117209 * | 11/2006 | ............. H02K 11/40 |

OTHER PUBLICATIONS

International Search Report (PCT/ISA/210) issued in PCT Application No. PCT/EP2017/070415 dated Nov. 27, 2017 with English translation (six (6) pages).

German-language Written Opinion (PCT/ISA/237) issued in PCT Application No. PCT/EP2017/070415 dated Nov. 27, 2017 (10 pages).

German-language Search Report issued in counterpart German Application No. 10 2016 216 909.2 dated Jul. 21, 2017 with partial English translation (10 pages).

Chinese-language Office Action issued in counterpart Chinese Application No. 201780032645.5 dated Dec. 2, 2019 with English translation (12 pages).

Chinese-language Office Action issued in Chinese Application No. 201780032645.5 dated Aug. 19, 2020 with English translation (14 pages).

* cited by examiner

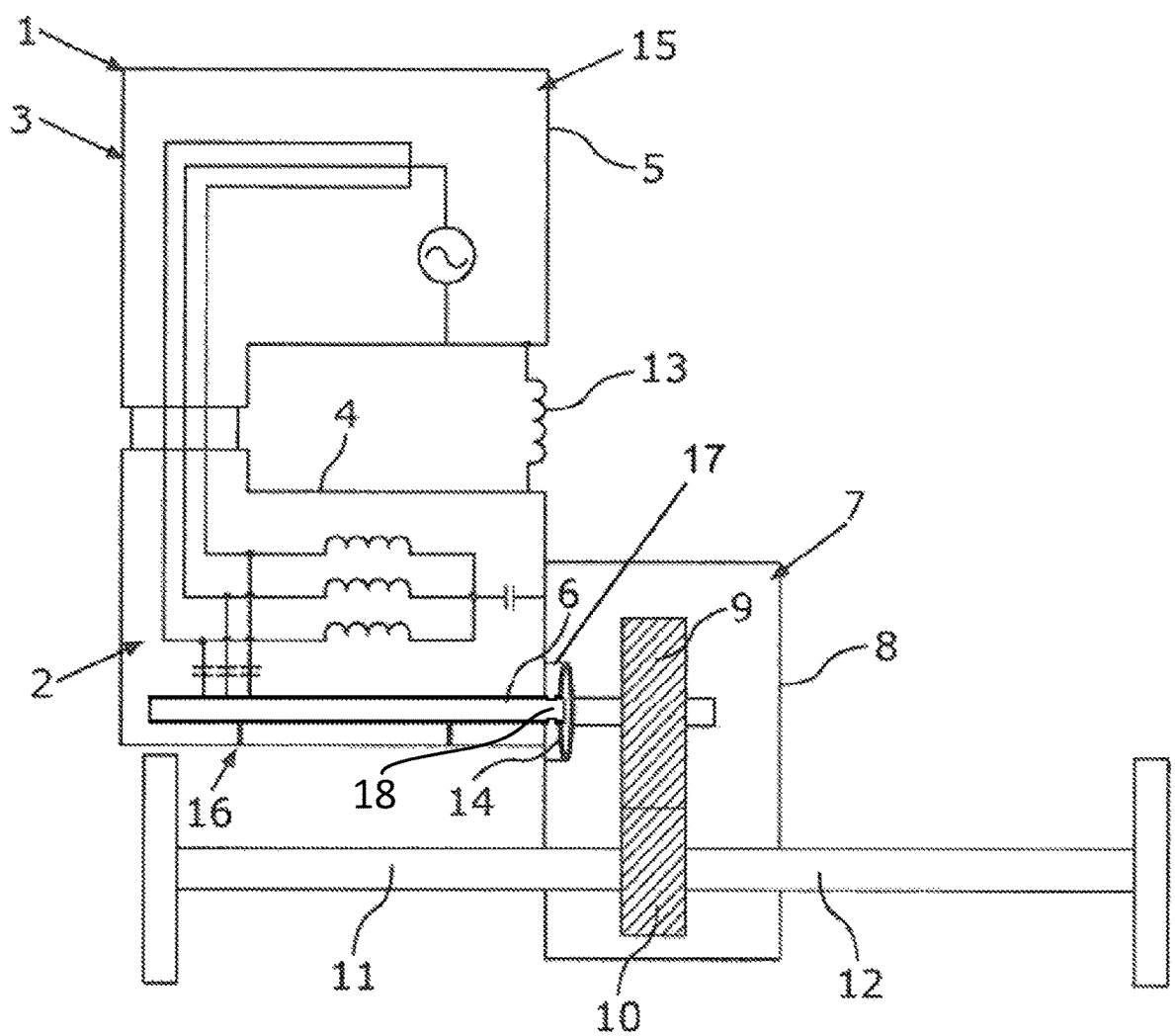

ically advantageous and a particularly low-wear operation of the drive device in a cost-effective manner, according to the invention at least one discharge ring is provided, which is also referred to as a shaft discharge ring or a shaft grounding ring. Via the discharge ring, the shaft is brought into electrical contact with the housing element in order to dissipate electrical charges from the shaft to the housing element via the discharge ring. The discharge ring here is formed from an electrically conductive fluid.

DRIVE DEVICE FOR A MOTOR VEHICLE

CROSS REFERENCE TO RELATED APPLICATIONS

This application is a continuation of PCT International Application No. PCT/EP2017/070415, filed Aug. 11, 2017, which claims priority under 35 U.S.C. § 119 from German Patent Application No. 10 2016 216 909.2, filed Sep. 6, 2016, the entire disclosures of which are herein expressly incorporated by reference.

BACKGROUND AND SUMMARY OF THE INVENTION

The invention relates to a drive device for a motor vehicle, in particular a car, and to a motor vehicle having such a drive device. The drive device includes at least one electric machine and at least one shaft which is mounted rotatably on a housing element of the drive device and can be driven by the electric machine.

Such a drive device for a motor vehicle, in particular a car, is already well known from the general prior art and, in particular, from the standard vehicle. The drive device here comprises at least one electric machine, and at least one shaft which is mounted rotatably on a housing element of the drive device and can be driven by the electric machine. For example, the electric machine can use the shaft to provide torques, by means of which, for example, at least one wheel of the motor vehicle, and therefore, for example, the motor vehicle as a whole, can be electrically driven.

Furthermore, DE 35 11 755 A1 discloses an arrangement for dissipating shaft voltages having steep voltage peaks, and/or high-frequency voltage components of shafts of dynamo-electric machines.

DE 11 2010 004 938 T5 discloses an arrangement for dissipating an electrical charge on a rotating shaft, which is at least partially surrounded by a stationary housing. The housing and the shaft are separated here by one or more bearings, wherein the arrangement includes an annular conductive charge-dissipating component, via which electrical charges can be dissipated from the shaft to the housing.

DE 10 2004 011 867 T2 discloses an assembly for dissipating static changes associated with a shaft of an electric motor, wherein the assembly comprises an annular frame.

Finally, a bearing system for a wind turbine is known from DE 10 2013 200 356 A1.

It is the object of the present invention to further develop a drive device and a motor vehicle of the type mentioned at the beginning in such a manner that particularly advantageous and low-wear operation can be realized in a cost-effective manner.

This and other objects are achieved by a drive device and by a motor vehicle in accordance with embodiments of the invention.

A first aspect of the invention relates to a drive device for a motor vehicle, in particular for a car, such as, for example, a passenger car. The drive device comprises at least one electric machine, and at least one shaft which is mounted rotatably on a housing element of the drive device and can be driven by the electric machine. The electric machine here can, for example, use the shaft to provide torques, by which, for example, at least one wheel, and therefore in particular the motor vehicle as a whole, can be driven.

In order now to be able to realize a particularly advantageous and a particularly low-wear operation of the drive device in a cost-effective manner, according to the invention at least one discharge ring is provided, which is also referred to as a shaft discharge ring or a shaft grounding ring. Via the discharge ring, the shaft is brought into electrical contact with the housing element in order to dissipate electrical charges from the shaft to the housing element via the discharge ring. The discharge ring here is formed from an electrically conductive fluid.

During operation of the drive device and in particular of the electric machine, electrical charges or voltages, for example, can be induced in the shaft. If appropriate measures, such as, for example, the discharge ring, are not provided, such a voltage induced in the shaft can be discharged, for example, via a bearing, via which the shaft is mounted rotatably on the housing element, and can therefore lead within a short time to a high degree of wear or even to damage of the bearing. In order to avoid such an abrupt discharge, the discharge ring is used in order, for example, to ground the shaft or to connect same electrically to ground, and therefore electrical charges can be dissipated in a targeted manner from the shaft to the housing element via the discharge ring. As a result, damage and excessive wear of bearings can be avoided. Since the discharge ring is now formed according to the invention from an electrically conductive fluid, wear of the discharge ring and excessive wear of the shaft caused by the discharge ring can be avoided. Furthermore, the costs of the drive device according to the invention can be kept particularly low since further additional measures for dissipating electrical charges from the shaft can be avoided. One such customarily additional measure is to use silver plating of the shaft, but this can now be avoided in the drive device according to the invention.

By use of the discharge ring, which is formed from a conductive fluid, an electrical contact can be produced between the housing element and the shaft in a wear-free manner, and therefore, via said electrical contact, electrical charge can be dissipated in a targeted manner from the shaft to the housing element, and therefore, for example, to ground. In other words, the charging ring which is formed from an electrically conductive fluid makes it possible to remove electric currents from the shaft to the housing element via the discharge ring in a targeted manner such that excessive wear of the drive device can be avoided.

It has been shown to be particularly advantageous here if the discharge ring is formed from an electrically conductive fluid. Electrical charges or electric currents can thereby be dissipated from the shaft in a particularly targeted and advantageous and also wear-free manner.

A further embodiment is distinguished in that a mounting is provided, via which the shaft is mounted rotatably on the housing element. The mounting is therefore a mounting device which, for example, has at least one bearing element or a plurality of bearing elements. The shaft is mounted, in particular in the radial and/or in the axial direction, on the housing via the bearing element or via the bearing elements so as to be rotatable about an axis of rotation relative to the housing. In order to realize a targeted and particularly advantageous dissipation of electrical charge or electric currents here, the discharge ring is a component which is different from the mounting and is provided in addition thereto. The discharge ring is thus preferably neither a bearing element nor a lubricant for lubricating such a bearing element of the mounting. The mounting comprises, for example, a lubricant, such as an oil. At least one bearing point of the mounting is lubricated by means of the lubricant, wherein the shaft is mounted rotatably on the housing element at the bearing point. It is contemplated here for at least one bearing element of the mounting to be arranged at the bearing point. It is preferably provided here for the discharge ring or the fluid forming the discharge ring to be a component which is different from the lubricant of the mounting and is provided in addition thereto.

In order also to be able to dissipate even particularly low electrical charges or currents from the shaft in a targeted manner, it is provided in a further embodiment of the invention that the discharge ring directly touches the shaft and/or the housing element. Abrupt discharges and resulting damage can thereby be reliably avoided.

In a further embodiment of the invention, it is provided that the discharge ring is at least partially accommodated in a corresponding annular receptacle of the shaft and/or of the housing element. The annular receptacle is formed, for example, by a groove of the shaft or of the housing element. By way of this at least partial arrangement of the discharge ring in the receptacle, the discharge ring can be brought particularly readily into contact with the shaft or the housing element, and therefore electrical charges or electric currents can be particularly readily dissipated. Furthermore, the requirement for construction space, in particular in the radial direction of the shaft, can thereby be kept particularly low.

Finally, it has been shown to be particularly advantageous if the fluid forming the discharge ring has at least one ionic liquid. The electrical resistance of the discharge ring can thereby be kept particularly low, and therefore even particularly low electrical charges or currents can be dissipated in a targeted and advantageous manner.

A second aspect of the invention relates to a motor vehicle which includes at least one drive device according to the invention. Advantages and advantageous refinements of the first aspect of the invention should be considered to be advantages and advantageous refinements of the second aspect of the invention, and vice versa.

The invention is based in particular on the finding that conventional discharge rings, which are also referred to as shaft grounding rings, comprise a brush arrangement with carbon fiber brushes in order to produce electrical conductivity between the shaft and the housing element. Furthermore, use is customarily made of carbon contacts which are pressed onto the shaft. It has been found that carbon fibers and therefore carbon fiber brushes break off even after a short time, as a result of which the electrical conductivity of the discharge ring is impaired. Furthermore, the broken-off carbon fibers can be distributed in bearings, which leads to a particularly high degree of wear. Furthermore, carbon contacts and also carbon brushes or carbon fiber brushes have a high degree of wear. These problems and disadvantages can be avoided by means of the invention since the discharge ring formed from the electrically conductive fluid is not subject to any wear and also does not bring about any (or any excessive) wear of the shaft. Furthermore, it is possible to avoid wear, which is brought about or assisted by the discharge ring, of a mounting, via which the shaft is mounted rotatably on the housing element.

Other objects, advantages and novel features of the present invention will become apparent from the following detailed description of one or more preferred embodiments when considered in conjunction with the accompanying drawings.

BRIEF DESCRIPTION OF THE DRAWINGS

The single FIGURE is a schematic side view of a drive device for a motor vehicle, in particular a car, having at least one electric machine and at least one shaft which is mounted rotatably on a housing element of the drive device and can be driven by the electric machine, wherein at least one discharge ring is provided, which is formed from an electrically conductive fluid.

DETAILED DESCRIPTION OF THE DRAWINGS

The single FIGURE shows, in a schematic side view, a drive device, denoted as a whole by 1, for a motor vehicle, in particular a car, such as, for example, a passenger car. This means that, in the fully produced state of the motor vehicle, the drive device 1 is part of the motor vehicle, wherein at least one wheel of the motor vehicle, and preferably the motor vehicle as a whole, can be driven, in particular electrically, by means of the drive device 1.

For this purpose, the drive device 1 has an electric machine 2 and a housing element which is denoted as a whole by 3 and includes at least one housing part 4 of the electric machine 2. Electric components of the electric machine 2 are accommodated in the housing part 4.

The electric machine 2 can be operated, for example, in a motor mode and therefore as an electric motor. In this case, the wheel or the motor vehicle as a whole can be driven by means of the electric machine 2 in the motor mode thereof since the electric machine 2 in the motor mode thereof provides torques for driving the wheel or the motor vehicle as a whole.

In order to operate the electric machine 2 in the motor mode, the electric machine 2 is supplied with electrical energy or electric current. For this purpose, the motor vehicle includes, for example, at least one energy accumulator (not illustrated in the FIGURE) which, for example, is in the form of an electrochemical energy accumulator. In particular, the energy accumulator is in the form of a high-voltage battery (HV battery), wherein electrical energy can be stored by means of the energy accumulator. In the motor mode, the electric machine 2 is, for example, supplied with electrical energy stored in the energy accumulator.

In particular, it is contemplated that the electric machine 2 can also be operated in a generator mode and therefore as a generator. In the generator mode, the electric machine 2 is driven, for example, by the motor vehicle or by the at least one wheel of the motor vehicle and therefore by kinetic energy of the motor vehicle. In the generator mode, the electric machine 2 converts at least some of the kinetic energy from the motor vehicle into electrical energy. This electrical energy is provided by the generator, and therefore the provided energy can be, for example, supplied to at least one electrical consumer of the motor vehicle and/or stored in the energy accumulator. By conversion of kinetic energy into electrical energy, the motor vehicle is braked.

The drive device 1 furthermore includes, for example, an inverter 15. The inverter 15 has a second housing part 5, which is part of the housing element 3. Electric components of the inverter 4 are accommodated in the housing part 5. The inverter 4 is used, for example, to convert a d.c. voltage provided by a d.c. voltage source, or a d.c. current into a.c. voltage or a.c. current, wherein the electric machine 2 is supplied with the a.c. voltage or the a.c. current. For this purpose, the inverter 15 is electrically connected to the electric machine 2. The electric machine 2 is driven by means of this supplying of the electric machine 2 with the a.c. voltage provided by the inverter 15.

The drive device 1 furthermore has at least one shaft 6 which is mounted rotatably on the housing element 3 of the drive device 1 and can be driven by the electric machine 2. The shaft 6 is, for example, a shaft of the electric machine 2 and is therefore also referred to as the machine shaft. The electric machine 2 in the motor mode thereof can use the shaft 6 to provide torques for driving the wheel or the motor vehicle.

The electric machine has, for example, a stator and a rotor, which rotor is rotatable about an axis of rotation relative to the stator. The shaft 6 here is, for example, part of the rotor, and therefore the shaft 6 is rotatable about the axis of rotation relative to the stator and in particular relative to the housing element 3. As will be explained more precisely below, the shaft 6 is mounted on the housing element 3 so as to be rotatable about the axis of rotation relative to the housing element 3. It can be seen from the FIGURE that the shaft 6 is at least partially, in particular at least predominantly, accommodated in the housing element 3, in particular in the housing part 4 of the electric machine 2.

The drive device 1 furthermore includes a transmission 7 (illustrated particularly schematically in the FIGURE), via which the at least one wheel or the motor vehicle as a whole can be driven by the electric machine 2. The transmission 7 here has a third housing part 8 which is part of the housing element 3. For example, transmission elements of the transmission 7 are accommodated in the housing part 8, which is also referred to as a transmission housing. Such a transmission element is, for example, a gearwheel 9 which, for example, is in the form of a spur gear. The gearwheel 9 can be driven by the shaft 6, wherein the gearwheel 9 is connected to the shaft 6, for example for rotation therewith. For example, the torques provided by the electric machine 2 can be introduced via the shaft 6 and the gearwheel 9 into the transmission 7, and therefore the transmission 7 and via the latter the motor vehicle can be driven by means of the torques provided by the electric machine 2.

As a further transmission element, the transmission 7 includes, for example, a further gearwheel 10 which is accommodated in the housing part 8, is in engagement with the gearwheel 9 and is in the form, for example, of a spur gear. Drive shafts 11 and 12 of the drive device 1 can be driven via the gearwheel 6, and therefore the drive shafts 11 and 12 can be driven by the electric machine 2 or by the shaft 6 via the transmission 7. The drive shafts 11 and 12 are, for example, couplable or coupled at least indirectly to the respective wheels of the motor vehicle. Therefore, respective wheels of the motor vehicle, and therefore the motor vehicle as a whole, can be electrically driven via the drive shafts 11 and 12. The motor vehicle here is in the form, for example, of a hybrid vehicle or an electric vehicle and can be driven electrically by means of the electric machine 2.

In addition, the drive device 1 includes at least one ground strap 13 via which, for example, the ground of the inverter 4 is electrically connected to the electric machine 2, in particular to the housing part 4. It can furthermore be seen from the FIGURE that the shaft 6 is at least partially accommodated in the housing part 8. The shaft 6 is mounted rotatably on the housing element 3, in particular on the housing part 4 and/or on the housing part 8, for example via a mounting 16 (illustrated particularly schematically in the FIGURE). For this purpose, the mounting 16, which is also referred to as a mounting device, comprises at least one bearing element or a plurality of bearing elements, via which the shaft 6 is supported rotatably, and therefore mounted, in its axial direction and/or in the radial direction on the housing element 3. The respective bearing element is in the form, for example, of a plain bearing or else a rolling bearing. Furthermore, the respective bearing element is arranged at a respective bearing point at which the shaft 6 is mounted on the housing element 3.

Use is preferably made of a lubricant which is in the form, for example, of a liquid and is in the form, for example, of an oil. The respective bearing point and the bearing element arranged at the respective bearing point are supplied here with the lubricant in order to lubricate and to cool the bearing point or the bearing element.

In order now to realize particularly advantageous and low-wear operation of the drive device 1 in a particularly cost-effective manner, the drive device 1 includes at least one discharge ring 14, via which the shaft 6 is electrically connected to the housing element 3 and is therefore electrically joined to the housing element 3. The shaft 6 here is brought into electrical contact with the housing part 3 via the discharge ring 4 in order thereby to dissipate electrical charges or electric currents from the shaft 6 to the housing element 3 via the discharge ring 14, which is also referred to as the shaft grounding ring.

Undesirably, but technically non-avoidably, the inverter 15 acts as a common mode interference source, which is also referred to as common-mode source (CM source). The inverter 15 brings about effects here, by means of which voltages can be induced in the shaft 6.

If, for example, the discharge ring 14 is now not used, the voltages induced in the shaft 6 can be abruptly discharged via the mounting 16 and, in particular, via the bearing elements. Therefore, electric currents can flow from the shaft 6 via the bearing elements. This results within a short time in a high degree of wear of the bearing elements which may even cause damage thereto. By the use of the discharge ring 14, such undesirable electric currents can be avoided since electrical charge can be dissipated from the shaft 6 to the housing element 3 in a targeted manner via the discharge ring 14.

In order to be able to keep the wear and the costs of the drive device 1 particularly low here, the discharge ring 14 is formed from an electrically conductive or conductive fluid, in particular from an electrically conductive liquid. The electrically conductive liquid can be at least one ionic liquid. Electrical resistance of the discharge ring 14 can thereby be kept particularly low, and therefore also even low electrical charges can be dissipated from the shaft 6 to the housing element 3 in a targeted manner via the discharge ring 14.

The discharge ring 14 and therefore the fluid forming the discharge ring 14 preferably touches or makes contact with the shaft 6 and the housing element 3, in particular the housing part 8, directly, and therefore even small electrical charges can be dissipated in a targeted manner.

Using the example of the housing part 8, it can be seen that the housing element 3, in particular the housing part 8, has, for example, an at least substantially annular receptacle 17 in which the discharge ring 14 is at least partially arranged. Alternatively or additionally thereto, it is contemplated that the shaft 6 has an annular receptacle 18 in which the discharge ring 14 is at least partially accommodated. The respective receptacle 17 of the housing element 3 or the receptacle 18 of the shaft 6 is formed, for example, by a corresponding groove which, for example, completely runs around in the circumferential direction of the shaft 6.

Since the discharge ring 14 is formed by the fluid mentioned, wear of the discharge ring 14 can be avoided. Furthermore, wear of the shaft 6 brought about by the discharge ring 14 can be avoided or at least kept low, and therefore reliable dissipation of electrical charges from the shaft 6 to the housing element via the discharge ring 14 can be ensured over a long service life.

In order to be able to realize particularly advantageous and targeted discharging of the shaft 6 here, it is preferably provided that the discharge ring 14 or the fluid forming the discharge ring 14 is a component which is different from the mounting 16 and in particular from the lubricant of the mounting 16 and is provided in addition to the mounting or in addition to the lubricant. Therefore, the fluid forming the discharge ring 14 is not the lubricant and is not used for lubricating a bearing point.

LIST OF REFERENCE SIGNS

1 Drive device
2 Electric machine
3 Housing element
4 Housing part
5 Housing part
6 Shaft
7 Transmission
8 Housing part
9 Gearwheel
10 Gearwheel
11 Drive shaft
12 Drive shaft
13 Ground strap
14 Discharge ring
15 Inverter
16 Mounting
17 Receptacle
18 Annular receptacle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive device for a motor vehicle, comprising:
    a housing element of the drive device;
    at least one electric machine;
    at least one shaft which is mounted rotatably on the housing element of the drive device and is drivable via the electric machine; and
    at least one discharge ring containing an electrically conductive fluid, via which the shaft is brought into electrical contact with the housing element in order to dissipate electrical charges from the shaft to the housing element via the electrically conductive fluid of the discharge ring, wherein
        the discharge ring is at least partially arranged in a receptacle of the housing element and at least partially accommodated in a corresponding annular receptacle of the shaft.

2. The drive device as claimed in claim 1, further comprising:
    an inverter to supply a voltage to the electric machine and to act as a common-mode source which induces the electrical charges in the shaft.

3. The drive device as claimed in claim 2, wherein the voltage is an a.c. voltage.

4. The drive device as claimed in claim 1, further comprising:
    a mounting, via which the shaft is mounted rotatably on the housing element, wherein
    the discharge ring is a component which is different from the mounting and is provided in addition thereto.

5. The drive device as claimed in claim 4, wherein
    the discharge ring directly touches the shaft and/or the housing element.

6. The drive device as claimed in claim 1, wherein the discharge ring directly touches the shaft and/or the housing element.

7. The drive device as claimed in claim 1, wherein the fluid comprises an ionic liquid.

8. The drive device as claimed in claim 5, wherein
    the fluid comprises an ionic liquid.

9. A motor vehicle, comprising at least one drive device as claimed in claim 1.

10. A drive device for a motor vehicle, comprising:
    a housing element of the drive device;
    at least one electric machine;
    at least one shaft which is mounted rotatably on the housing element of the drive device and is drivable via the electric machine; and
    at least one discharge ring containing an electrically conductive fluid, via which the shaft is brought into electrical contact with the housing element in order to dissipate electrical charges from the shaft to the housing element via the discharge ring, wherein
        the discharge ring is at least partially accommodated in an annular receptacle of the shaft formed by a circumferential groove.

11. The drive device as claimed in claim 10, further comprising:
    a mounting, via which the shaft is mounted rotatably on the housing element, wherein
    the discharge ring is a component which is different from the mounting and is provided in addition thereto.

12. The drive device as claimed in claim 10, wherein
    the discharge ring directly touches the shaft and/or the housing element.

* * * * *